(12) United States Patent
Jin et al.

(10) Patent No.: US 10,966,210 B2
(45) Date of Patent: *Mar. 30, 2021

(54) WIRELESS COMMUNICATION SYSTEM AND METHOD FOR MANAGING RESOURCE FOR INTERFERENCE COORDINATION THEREIN

(71) Applicant: Samsung Electronics Co., Ltd., Suwon-si (KR)

(72) Inventors: Miseong Jin, Seongnam-si (KR); Sangyun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,886

(22) Filed: Feb. 21, 2019

(65) Prior Publication Data
US 2019/0182843 A1   Jun. 13, 2019

Related U.S. Application Data

(63) Continuation of application No. 14/837,235, filed on Aug. 27, 2015, now Pat. No. 10,244,539.

(30) Foreign Application Priority Data

Aug. 27, 2014   (KR) .................. 10-2014-0112585

(51) Int. Cl.
*H04W 72/08* (2009.01)
*H04W 52/24* (2009.01)
(Continued)

(52) U.S. Cl.
CPC ......... *H04W 72/082* (2013.01); *H04W 16/00* (2013.01); *H04W 28/16* (2013.01); *H04W 52/244* (2013.01); *H04W 88/08* (2013.01)

(58) Field of Classification Search
CPC ....... H04L 5/001; H04L 5/005; H04L 5/0073; H04L 5/0094; H04W 16/00; H04W 16/16;
(Continued)

(56) References Cited

U.S. PATENT DOCUMENTS 6,606,341 B1   8/2003   Kanterakis et al.
6,710,881 B1   3/2004   Ngoi et al.
(Continued)

FOREIGN PATENT DOCUMENTS

CN   102761973 A   10/2012
CN   103201970 A   7/2013
(Continued)

OTHER PUBLICATIONS

NTT Docomo: "Performance Evaluation of ICIC for SCE", 3GPP Draft; R1-133459 EICIC for SCE, 3rd Generation Partnership Project (3GPP), Mobile Competence Centre ; 650, Route Des Lucioles ; F-06921 Sophia-Antipolis Cedex ; France, vol. RAN WG1, no. Barcelona, Spain; Aug. 19, 2013-Aug. 23, 2013 Aug. 10, 2013 (Aug. 10, 2013), XP050716567, Retrieved from the Internet: URL:http://www.3gpp.org/ftp/tsg_ran/WG1_RL1/TSGR1_74/ Docs [retrieved on Aug. 10, 2013] * paragraph [0002].
(Continued)

*Primary Examiner* — Eric Nowlin
(74) *Attorney, Agent, or Firm* — Jefferson IP Law, LLP

(57) ABSTRACT

A communication method of a base station is provided. The communication method of the base station includes determining, by the base station, an aggregate interference caused by a terminal in a heterogeneous cell, transmitting information about the aggregate interference to a higher layer node entity, receiving information about an almost blank sub-
(Continued)

frame (ABS) pattern from the higher node entity, and configuring an ABS based on the information about the ABS pattern.

21 Claims, 10 Drawing Sheets

(51) Int. Cl.
*H04W 16/00* (2009.01)
*H04W 28/16* (2009.01)
*H04W 88/08* (2009.01)

(58) Field of Classification Search
CPC ... H04W 24/08; H04W 28/16; H04W 52/143; H04W 52/146; H04W 52/16; H04W 52/242; H04W 52/244; H04W 52/325; H04W 72/042; H04W 72/082; H04W 72/1273; H04W 72/1278; H04W 84/045; H04W 88/08; H04W 92/20
See application file for complete search history.

(56) References Cited

U.S. PATENT DOCUMENTS

| | | |
|---|---|---|
| 6,985,511 B2 | 1/2006 | Kanterakis et al. |
| 7,239,949 B2 | 7/2007 | Lu et al. |
| 8,611,277 B2 | 12/2013 | Krishnamurthy et al. |
| 8,654,727 B2 | 2/2014 | Dai et al. |
| 8,737,276 B2 | 5/2014 | Madan et al. |
| 8,767,708 B2 | 7/2014 | Krishnamurthy et al. |
| 8,786,352 B2 | 7/2014 | Komine et al. |
| 8,787,194 B2 | 7/2014 | Yang et al. |
| 8,787,214 B2 | 7/2014 | Gan et al. |
| 8,848,560 B2 | 9/2014 | Muruganathan et al. |
| 8,868,097 B2 | 10/2014 | Kwon et al. |
| 8,897,235 B2 | 11/2014 | Luo et al. |
| 8,934,452 B2 | 1/2015 | Zou |
| 8,971,275 B2 | 3/2015 | Dinan |
| 9,002,381 B2 | 4/2015 | Pei |
| 9,008,675 B2 | 4/2015 | Seo et al. |
| 9,066,329 B2 | 6/2015 | Maeda et al. |
| 9,072,054 B2 | 6/2015 | Ji et al. |
| 9,113,350 B2 | 8/2015 | Militano et al. |
| 9,161,236 B2 | 10/2015 | Seo et al. |
| 9,179,396 B2 | 11/2015 | Wang et al. |
| 9,184,973 B2 | 11/2015 | Yu et al. |
| 9,185,590 B2 | 11/2015 | Yang et al. |
| 9,185,669 B2 | 11/2015 | Lee et al. |
| 9,191,061 B2 | 11/2015 | Yu et al. |
| 9,197,478 B2 | 11/2015 | Yu et al. |
| 9,219,994 B2 | 12/2015 | Park et al. |
| 9,226,312 B2 | 12/2015 | Ji et al. |
| 9,277,562 B2 | 3/2016 | Dinan |
| 9,282,577 B2 | 3/2016 | Nishio et al. |
| 9,295,059 B2 | 3/2016 | Dinan |
| 9,295,060 B2 | 3/2016 | Dinan |
| 9,320,043 B2 | 4/2016 | Lee et al. |
| 9,325,475 B2 | 4/2016 | Hoshino et al. |
| 9,326,286 B2 | 4/2016 | Dinan |
| 9,344,905 B2 | 5/2016 | Yang et al. |
| 9,345,023 B2 | 5/2016 | Gayde et al. |
| 9,369,897 B2 | 6/2016 | Nagata et al. |
| 9,369,899 B2 | 6/2016 | Yang et al. |
| 9,369,915 B2 | 6/2016 | Hooli et al. |
| 9,379,765 B2 | 6/2016 | Yu et al. |
| 9,380,563 B2 | 6/2016 | Mochizuki et al. |
| 9,385,853 B2 | 7/2016 | Zhou et al. |
| 9,386,467 B2 | 7/2016 | Maeda et al. |
| 9,386,535 B2 | 7/2016 | Park et al. |
| 9,392,535 B2 | 7/2016 | Yuk et al. |
| 9,392,585 B2 | 7/2016 | Takano |
| 9,392,599 B2 | 7/2016 | Maeda et al. |
| 9,392,608 B2 | 7/2016 | Song et al. |
| 9,397,865 B2 | 7/2016 | Seo et al. |
| 9,407,490 B2 | 8/2016 | Chance et al. |
| 9,408,085 B2 | 8/2016 | Abe et al. |
| 9,414,242 B2 | 8/2016 | Kim et al. |
| 9,414,325 B2 | 8/2016 | Zhang et al. |
| 9,432,901 B1 | 8/2016 | Kwan |
| 9,450,695 B2 | 9/2016 | Zhu et al. |
| 9,451,589 B2 | 9/2016 | Nishio et al. |
| 9,467,918 B1 | 10/2016 | Kwan |
| 9,499,995 B2 | 11/2016 | Xiong et al. |
| 9,510,344 B2 | 11/2016 | Ren et al. |
| 9,516,650 B2 | 12/2016 | Ouchi et al. |
| 9,521,603 B2 | 12/2016 | Yamazaki |
| 9,521,654 B2 | 12/2016 | Yang et al. |
| 9,526,100 B2 | 12/2016 | Kim et al. |
| 9,526,104 B2 | 12/2016 | Dinan |
| 9,538,406 B2 | 1/2017 | Yang et al. |
| 9,544,111 B2 | 1/2017 | Noh |
| 9,549,382 B2 | 1/2017 | Dinan |
| 9,554,343 B2 | 1/2017 | Nagata et al. |
| 9,565,641 B2 | 2/2017 | Ouchi et al. |
| 9,565,674 B2 | 2/2017 | Dinan |
| 9,575,157 B2 | 2/2017 | Militano et al. |
| 9,578,603 B2 | 2/2017 | Liu |
| 9,591,533 B2 | 3/2017 | Song et al. |
| 9,591,651 B2 | 3/2017 | Dinan |
| 9,596,681 B2 | 3/2017 | Dinan |
| 9,603,060 B2 | 3/2017 | Maeda et al. |
| 9,603,084 B2 | 3/2017 | Kim et al. |
| 9,603,100 B2 | 3/2017 | Ouchi et al. |
| 9,608,788 B2 | 3/2017 | Yang et al. |
| 9,609,536 B2 | 3/2017 | Barbieri et al. |
| 9,622,170 B2 | 4/2017 | Zhu et al. |
| 9,629,016 B2 | 4/2017 | Xin et al. |
| 9,661,580 B2 | 5/2017 | Tie et al. |
| 9,661,584 B2 | 5/2017 | Liang et al. |
| 9,661,589 B2 | 5/2017 | Ouchi et al. |
| 9,667,372 B2 | 5/2017 | Ohwatari et al. |
| 9,674,725 B2 | 6/2017 | Yang et al. |
| 9,686,058 B2 | 6/2017 | Kim et al. |
| 9,698,922 B2 | 7/2017 | Dinan |
| 9,699,742 B2 | 7/2017 | Ko et al. |
| 9,713,049 B2 | 7/2017 | Huang et al. |
| 9,723,569 B2 | 8/2017 | Nishikawa et al. |
| 9,730,213 B2 | 8/2017 | Maeda et al. |
| 9,749,935 B2 | 8/2017 | Li et al. |
| 9,774,308 B2 | 9/2017 | Li et al. |
| 9,794,887 B2 | 10/2017 | Ouchi et al. |
| 9,801,189 B2 | 10/2017 | Song et al. |
| 9,801,210 B2 | 10/2017 | Nishio et al. |
| 9,820,254 B2 | 11/2017 | Mochizuki et al. |
| 2005/0080543 A1 | 4/2005 | Lu et al. |
| 2011/0249642 A1 | 10/2011 | Song et al. |
| 2011/0256861 A1 | 10/2011 | Yoo et al. |
| 2011/0275394 A1 | 11/2011 | Song et al. |
| 2011/0310830 A1 | 12/2011 | Wu et al. |
| 2012/0034925 A1 | 2/2012 | Noh et al. |
| 2012/0046030 A1 | 2/2012 | Siomina et al. |
| 2012/0113812 A1 | 5/2012 | Ji et al. |
| 2012/0113844 A1 | 5/2012 | Krishnamurthy |
| 2012/0122472 A1 | 5/2012 | Krishnamurthy et al. |
| 2012/0129527 A1* | 5/2012 | Takeuchi ............ H04W 36/30 455/436 |
| 2012/0270536 A1 | 10/2012 | Ratasuk et al. |
| 2013/0003580 A1 | 1/2013 | Kovacs et al. |
| 2013/0010844 A1 | 1/2013 | Amini et al. |
| 2013/0033998 A1 | 2/2013 | Seo et al. |
| 2013/0058234 A1 | 3/2013 | Yang et al. |
| 2013/0107785 A1 | 5/2013 | Bhattad et al. |
| 2013/0107798 A1 | 5/2013 | Gao et al. |
| 2013/0114434 A1 | 5/2013 | Muruganathan et al. |
| 2013/0114435 A1 | 5/2013 | Wang et al. |
| 2013/0114483 A1 | 5/2013 | Suzuki |
| 2013/0114498 A1 | 5/2013 | Park et al. |
| 2013/0157660 A1 | 6/2013 | Awad et al. |
| 2013/0157709 A1 | 6/2013 | Ji et al. |
| 2013/0229972 A1 | 9/2013 | Lee et al. |
| 2013/0250927 A1 | 9/2013 | Song et al. |
| 2013/0272274 A1 | 10/2013 | Ishida et al. |

(56) References Cited

U.S. PATENT DOCUMENTS

| | | | |
|---|---|---|---|
| 2013/0279412 A1 | 10/2013 | Webb et al. | |
| 2013/0294271 A1 | 11/2013 | Nagata et al. | |
| 2013/0303152 A1 | 11/2013 | Kim et al. | |
| 2013/0322374 A1 | 12/2013 | Cai et al. | |
| 2014/0003301 A1 | 1/2014 | Madan et al. | |
| 2014/0023001 A1 | 1/2014 | Huang et al. | |
| 2014/0087720 A1 | 3/2014 | Takano | |
| 2014/0146750 A1 | 5/2014 | Kim et al. | |
| 2014/0169195 A1 | 6/2014 | Hsin et al. | |
| 2014/0177558 A1 | 6/2014 | Bagheri et al. | |
| 2014/0198678 A1 | 7/2014 | Kim et al. | |
| 2014/0204861 A1 | 7/2014 | Tie et al. | |
| 2014/0226554 A1 | 8/2014 | Wang et al. | |
| 2014/0247743 A1* | 9/2014 | Seo | H04W 24/10 370/252 |
| 2014/0254419 A1 | 9/2014 | Chun et al. | |
| 2014/0254537 A1 | 9/2014 | Kim et al. | |
| 2014/0256341 A1 | 9/2014 | Nayeb Nazar et al. | |
| 2014/0269597 A1 | 9/2014 | Park et al. | |
| 2014/0286283 A1 | 9/2014 | Kim et al. | |
| 2014/0293822 A1* | 10/2014 | Fujishiro | H04W 24/10 370/252 |
| 2014/0301349 A1 | 10/2014 | Takano | |
| 2014/0313923 A1 | 10/2014 | Yang et al. | |
| 2014/0321345 A1 | 10/2014 | Li et al. | |
| 2014/0321434 A1 | 10/2014 | Gayde et al. | |
| 2014/0364133 A1* | 12/2014 | Chae | H04W 72/082 455/450 |
| 2014/0376398 A1 | 12/2014 | Li et al. | |
| 2015/0003272 A1 | 1/2015 | Hu et al. | |
| 2015/0016289 A1* | 1/2015 | Yun | H04W 24/02 370/252 |
| 2015/0016387 A1 | 1/2015 | Elmdahl et al. | |
| 2015/0023309 A1 | 1/2015 | Wu et al. | |
| 2015/0029882 A1 | 1/2015 | Yang et al. | |
| 2015/0029889 A1 | 1/2015 | Stanze et al. | |
| 2015/0029907 A1 | 1/2015 | Cucala Garcia | |
| 2015/0036530 A1 | 2/2015 | Wu et al. | |
| 2015/0043406 A1 | 2/2015 | Ko et al. | |
| 2015/0050940 A1 | 2/2015 | Cai et al. | |
| 2015/0055502 A1 | 2/2015 | Seo et al. | |
| 2015/0078216 A1* | 3/2015 | Ribeiro | H04W 72/0473 370/278 |
| 2015/0092666 A1 | 4/2015 | Wu et al. | |
| 2015/0103683 A1 | 4/2015 | Kim et al. | |
| 2015/0110024 A1 | 4/2015 | Manssour et al. | |
| 2015/0110054 A1 | 4/2015 | Dinan | |
| 2015/0131600 A1 | 5/2015 | Dinan | |
| 2015/0131601 A1 | 5/2015 | Dinan | |
| 2015/0139018 A1 | 5/2015 | Dinan | |
| 2015/0139134 A1 | 5/2015 | Dinan | |
| 2015/0146659 A1 | 5/2015 | Dinan | |
| 2015/0181496 A1 | 6/2015 | Sasaki | |
| 2015/0181558 A1 | 6/2015 | Yang et al. | |
| 2015/0189526 A1 | 7/2015 | Yang et al. | |
| 2015/0195057 A1* | 7/2015 | Tan | H04J 11/0086 370/252 |
| 2015/0215856 A1 | 7/2015 | Kim et al. | |
| 2015/0222969 A1 | 8/2015 | Urata et al. | |
| 2015/0223202 A1* | 8/2015 | Yoshimoto | H04L 5/14 370/277 |
| 2015/0296400 A1 | 10/2015 | Yang et al. | |
| 2015/0311877 A1 | 10/2015 | Li et al. | |
| 2015/0326339 A1 | 11/2015 | Huang | |
| 2015/0350945 A1* | 12/2015 | Chae | H04J 11/0056 370/252 |
| 2015/0358050 A1 | 12/2015 | Lingam et al. | |
| 2015/0358855 A1 | 12/2015 | Yang et al. | |
| 2015/0373728 A1* | 12/2015 | Cui | H04W 72/082 370/252 |
| 2016/0021565 A1 | 1/2016 | Kim et al. | |
| 2016/0037538 A1 | 2/2016 | Li et al. | |
| 2016/0066334 A1 | 3/2016 | Jin et al. | |
| 2016/0081111 A1 | 3/2016 | Yi et al. | |
| 2016/0135194 A1 | 5/2016 | Kim et al. | |
| 2016/0183100 A1 | 6/2016 | Xue et al. | |
| 2016/0183266 A1 | 6/2016 | Dinan | |
| 2016/0198481 A1 | 7/2016 | Kikuchi et al. | |
| 2016/0205559 A1 | 7/2016 | Dinan | |
| 2016/0205640 A1 | 7/2016 | Dinan | |
| 2016/0211955 A1 | 7/2016 | Wu | |
| 2016/0233972 A1 | 8/2016 | Dinan | |
| 2016/0262035 A1 | 9/2016 | Yang et al. | |
| 2016/0270113 A1 | 9/2016 | Sun et al. | |
| 2016/0285602 A1 | 9/2016 | Fang | |
| 2016/0286561 A1 | 9/2016 | Huang et al. | |
| 2016/0353347 A1 | 12/2016 | Jun et al. | |
| 2016/0353451 A1 | 12/2016 | Ko et al. | |
| 2017/0099665 A1 | 4/2017 | Dinan | |
| 2017/0142698 A1 | 5/2017 | Dinan | |
| 2017/0150498 A1* | 5/2017 | Wang | H04W 72/0446 |
| 2017/0311378 A1* | 10/2017 | Tsuda | H04W 48/20 |
| 2017/0318491 A1 | 11/2017 | Chen et al. | |
| 2018/0110061 A1 | 4/2018 | Chen et al. | |
| 2018/0175923 A1 | 6/2018 | Liang et al. | |
| 2018/0309531 A1 | 10/2018 | Jeon et al. | |

FOREIGN PATENT DOCUMENTS

| | | |
|---|---|---|
| KR | 10-2012-0049449 A | 5/2012 |
| KR | 10-2013-0025399 A | 3/2013 |
| KR | 10-2013-0079582 A | 7/2013 |
| WO | 2013/172073 A1 | 11/2013 |

OTHER PUBLICATIONS

Intel Corporation: "Discussion on backhaul signaling and inter-eNB measurements to support DL-UL interference mitigation schemes", 3GPP Draft; R1-132392—Intel—ENB Measurements, 3GPP, Mobile Competence Centre ; 650, Route Des Lucioles ; F-06921 Sophia-Antipolis Cedex ; France, vol. RAN WG1, no. Fukuoka, Japan; May 20, 2013-May 24, 2013 May 11, 2013 (May 11, 2013), XP050698156, Retrieved from the Internet: URL:http://www.3gpp.org/ftp/tsg_ran/G1_RL1/TSGR1_73/Docs/ [retrieved on May 11, 2013] * paragraph [0002].

3GPP, LTE; Evolved Universal Terrestrial Radio Access (E-UTRA); FDD Home eNodeB (HeNB) Radio Frequency (RF) requirement analysis, TR 36.921, Apr. 2010, Version 9.0.0, Release 9 (Year: 2010).

Chinese Office Action dated Sep. 27, 2019, issued in Chinese Patent Application No. 201580046058.2.

Korean Office Action dated Jun. 22, 2020, issued in Korean Patent Application No. 10-2014-0112585.

* cited by examiner

WIRELESS COMMUNICATION SYSTEM AND METHOD FOR MANAGING RESOURCE FOR INTERFERENCE COORDINATION THEREIN

CROSS-REFERENCE TO RELATED APPLICATION(S)

This application is a continuation application of prior application Ser. No. 14/837,235, filed on Aug. 27, 2015, which claimed the benefit under U.S.C. § 119(a) of a Korean patent application filed on Aug. 27, 2014 in the Korean Intellectual Property Office and assigned Serial number 10-2014-0112585, the entire disclosure of which is hereby incorporated by reference.

TECHNICAL FIELD

The present disclosure relates to a wireless communication system and a method for managing a resource for inter-cell interference coordination therein. More particularly, the present disclosure relates to a method for determining a resource for inter-cell interference coordination in a wireless communication system and a system therefor.

BACKGROUND

In general, mobile communication systems have primarily been developed to provide voice communication services while guaranteeing user mobility. Mobile communication systems have gradually extended their scope of communication services to include high-speed data communication services as well as voice communication services. However, due to a lack of resources and a demand for higher-speed communication services by users in currently available mobile communication systems, an enhanced mobile communication system is needed.

To meet such requirements, a long term evolution (LTE) system, which is one of next-generation mobile communication systems under development, is being standardized in the 3rd generation partnership project (3GPP). LTE is technology for implementing high-speed packet based communication at a transmission rate of up to about 100 Mbps. Several schemes are being discussed to implement high-speed packet based communication. The schemes include, for example, a scheme for reducing the number of nodes on a communication path by simplifying the structure of a network and a scheme for maximally approximating radio protocols to radio channels.

A wireless communication system may include a plurality of base stations capable of supporting communication for a plurality of user equipments (UEs) (or terminals). A terminal may communicate with a base station on downlink and uplink. Downlink (or forward link) means a communication link from the base station to the terminal and uplink (or backward link) means a communication link from the terminal to the base station.

The base station may transmit data and control information to the terminal on downlink and/or receive data and control information from the terminal on uplink. Here, during the transmission of data and control information from the base station to the terminal on downlink, interference may occur due to transmission from neighboring base stations to other terminals. Interference may also occur on uplink during transmission from the terminal to the base station due to transmission from other terminals communicating with neighboring base stations. Such interference on downlink and uplink may deteriorate communication performance.

In the LTE system, inter-cell interference coordination (ICIC) is technology for enabling a base station to control interference by informing a neighboring cell of information about a maximum transmission power of a frequency resource used between cells. In more detail, the base station informs the neighboring cell of information about a resource block (RB) resource on which transmission is performed with a high power and information about an RB resource on which interference is sensed at a prescribed level or more among RB resources used in a cell thereof. Upon receiving the related information, the neighboring cell may adjust a transmission power and a scheduling method of an RB resource used thereby based on the received information.

In a heterogeneous environment of an LTE-advanced (LTE-A) system, a pico cell having a relatively low power is present in a macro cell having a relatively high transmission power. In this environment, however, an existing ICIC cannot show maximum performance due to severe interference between base stations. Accordingly, an ICIC technology in the time domain rather than in the frequency domain is needed and enhanced-ICIC (eICIC) based on the ICIC technology needs to be studied.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for determining a resource for ICIC and a method for reducing overhead between a pico base station and a macro base station in a wireless communication system.

Another aspect of the present disclosure is to provide a method for causing a network entity of a higher node to determine an almost blank subframe (ABS) resource by collecting information about a plurality of macro base stations without using backhauls between the macro base stations. The present disclosure is proposed to provide a method for reducing backhaul overhead between macro base stations.

In accordance with an aspect of the present disclosure, a communication method of a base station is provided. The communication method includes determining, by the base station, an aggregate interference caused by a terminal in a heterogeneous cell, transmitting information about the aggregate interference to a higher layer node entity, receiving information about an ABS pattern from the higher node entity, and configuring an ABS based on the information about the ABS pattern.

The determining of the aggregate interference may comprise measuring a reference signal (RS) power of the terminal in the heterogeneous cell, and determining the aggregate interference based on the RS power of the terminal in the heterogeneous cell.

The determining of the aggregate interference may further comprise determining an ABS ratio based on the information about the aggregate interference.

The ABS ratio may be proportional to the aggregate interference.

The higher node entity may be a radio resource manager (RRM).

In accordance with another aspect of the present disclosure, a communication method of a RRM is provided. The communication method includes receiving, by the RRM, information about an aggregate interference caused by a terminal in a heterogeneous cell from at least one base station, determining an ABS pattern applied to the at least one base station by based on the information about the aggregate interference, and transmitting information about the ABS pattern to the at least one base station.

The receiving of the information about the aggregate interference may comprise receiving an ABS ratio determined based on the information about the aggregate interference.

The determining of the ABS pattern may comprise determining an ABS ratio applied to the at least one base station based on the information about the aggregate interference, and determining the ABS pattern applied to the at least one base station based on the determined ABS ratio.

The at least one base station may be a macro base station and the terminal in the heterogeneous cell may be a terminal in a pico cell.

In accordance with another aspect of the present disclosure, a base station is provided. The base station includes a communication unit configured to transmit and receive a signal to and from other network entities, and a control unit including a processor programmed to determine an aggregate interference caused by a terminal of a heterogeneous cell, transmit information about the aggregate interference to a higher node entity, receive information about an ABS pattern from the higher node entity, and configure an ABS based on the information about the ABS pattern.

In accordance with another aspect of the present disclosure, an RRM is provided. The RRM includes a communication unit configured to transmit and receive a signal to and from other network entities, and a control unit including a processor programmed to receive information about an aggregate interference caused by a terminal in a heterogeneous cell from at least one base station, determine an ABS pattern applied to the at least one base station based on the information about the aggregate interference, and transmit information about the ABS pattern to the at least one base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
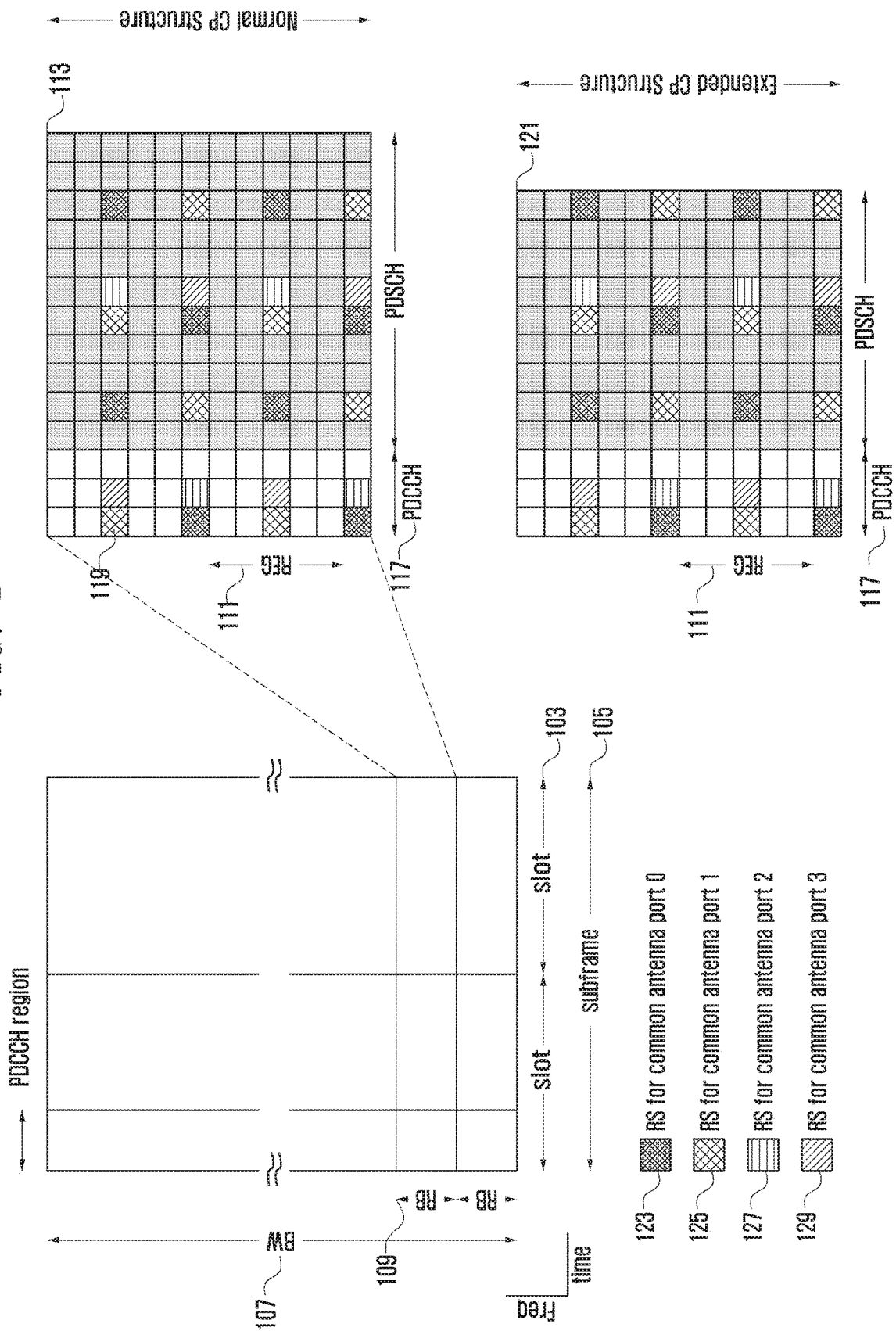
FIG. 1 illustrates a subframe structure in a long term evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein are defined based on functions in the present disclosure and may vary according to users' or operators' intention or usual practices. Therefore, the definition of the terms should be made based on the contents of the present disclosure.

In the present disclosure, although a description will be given of a long term evolution (LTE) system and an LTE-advanced (LTE-A) system by way of example, the present disclosure is applicable to other wireless communication system to which scheduling of a base station is applied.

In the present disclosure, a base station may be a network entity that communicates with terminals. In the present disclosure, the terms "base station," "evolved Node B (eNB)," "node B," "access point," etc. are used interchangeably. A base station may provide communication coverage for a particular geographic area. In a 3$^{rd}$ generation partnership project (3GPP), the term "cell" may mean a coverage area of a base station and/or a base station subsystem that serves this coverage area, depending on the context in which the term is used.

A base station may provide communication coverage for a macro cell, a pico cell, a femto cell, or some other type of cell. A macro cell may cover a relatively large geographic area (e.g. several kilometers in radius) and a pico cell may cover a relatively small geographic area. A base station for a macro cell may be referred to as a macro base station (MeNB) and a base station for a pico cell may be referred to as a pico base station (PeNB).

In the present disclosure, terminals may be dispersed throughout a mobile communication system and each terminal may be stationary or mobile. In the present disclosure, the terms "UE," "terminal," "terminal device," "mobile station," "subscriber unit," "station," etc. are used interchangeably. A terminal may be a cellular phone, a personal digital assistant (PDA), a wireless modem, a wireless communication device, a handheld device, a laptop computer, a cordless phone, a wireless local loop (WLL) station, a tablet, etc. A terminal serviced by a macro base station may be referred to as a macro terminal and a terminal serviced by a pico base station may be referred to as a pico terminal.

LTE systems use an orthogonal frequency division multiplexing (OFDM) transmission scheme. The OFDM transmission scheme is a scheme of transmitting data using multiple carriers. In more detail, the OFDM transmission scheme is a kind of multi-carrier modulation scheme that converts a serial input symbol stream into parallel symbol streams, modulates each of the parallel symbol streams into multiple carriers, i.e. multiple sub-carrier channels, that are orthogonal to each other, and then transmits the modulated multiple carriers.

The multi-carrier modulation scheme was first applied to high-frequency military radio receivers in the late 1950s and the OFDM scheme of overlapping a plurality of orthogonal sub-carriers was introduced in the 1970s. However, the multi-carrier modulation scheme and the OFDM scheme had limited applicability to actual systems because of difficulty in implementing orthogonal modulation between multiple carriers. Meanwhile, since Weinstein et al. announced in 1971 that OFDM based modulation/demodulation can be efficiently processed using discrete fourier transform (DFT), OFDM technology has rapidly developed. In addition, with the introduction of the OFDM scheme of using a guard interval and inserting cyclic prefix (CP) symbols in the guard interval, the negative impacts of the systems on multipath and delay spread have been further reduced.

With advances in these technologies, the OFDM scheme has been broadly applied to digital transmission technologies such as digital audio broadcasting (DAB), digital video broadcasting (DVB), wireless local area networking (WLAN), and wireless asynchronous transfer mode (WATM). That is, the OFDM scheme, which was not widely used due to hardware complexity, has become available with the recent development of various digital signal processing technologies including fast fourier transform (FFT) and inverse FFT (IFFT).

Although the OFDM scheme is similar to a frequency division multiplexing (FDM) scheme, optimal transmission efficiency can be obtained using the OFDM scheme during high-speed data transmission by maintaining orthogonality between a plurality of tones. In addition, the OFDM scheme has high frequency use efficiency and is robust against multipath fading, thereby acquiring optimal transmission efficiency during high-speed data transmission.

Other advantages of the OFDM scheme are high frequency use efficiency and robustness against frequency selective fading due to use of overlapping frequency spectrums. The OFDM scheme is also robust against multipath fading and is capable of reducing the influences of inter-symbol interference (ISI) using the guard interval. It is possible to simplify the hardware structure of an equalizer using the OFDM scheme. The OFDM scheme is being widely used in a communication system architecture due to the advantage of being robust against impulse noise.

In wireless communication systems, factors that hinder high-speed, high-quality data services are mainly caused by a channel environment. In the wireless communication systems, the channel environment frequently varies according to change in power of received signals caused by a fading phenomenon as well as additive white gaussian noise (AWGN), shadowing, Doppler effect caused by movement of a terminal and frequent change in speed of a terminal, and interference caused by other terminals and multipath signals. Therefore, it is necessary to effectively overcome factors that hinder the channel environment in order to support high-speed, high-quality data services in wireless communications.

In the OFDM scheme, a modulation signal is located on two-dimensional resources consisting of time and frequency resources. Resources in the time domain are distinguished by different orthogonal OFDM symbols. Resources in the frequency domain are distinguished by different orthogonal tones. In other words, in the OFDM scheme, one minimum unit resource may be indicated by designating a specific OFDM symbol in the time domain and a specific tone in the frequency domain. The minimum unit resource is called a resource element (RE). Different REs are orthogonal to each other even though they experience a frequency selective channel. Accordingly, signals transmitted on different REs may be received at a receiver without causing mutual interference.

A physical channel is a channel of a physical layer on which modulated symbols obtained by modulating one or more coded bit streams are transmitted. An OFDM Access (OFDMA) system configures and transmits multiple physical channels according to the usage and receiver of transmitted information streams. On which RE one physical channel is to be arranged and transmitted should be scheduled in advance between a transmitter and a receiver and this rule is called mapping.

In an LTE system, a representative system applied to downlink is an OFDM system and a representative system applied to uplink is a single carrier-frequency division multiple access (SC-FDMA) system. An LTE-A system is configured by extending the LTE system to multiple bands and a relay is applied to the LTE-A system.

FIGS. 1 through 10, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a subframe structure in an LTE system according to an embodiment of the present disclosure. Here, a subframe is supported for compatibility with the LTE-A system as well.

Referring to FIG. 1, an overall LTE transmission bandwidth 107 is illustrated, where the overall LTE transmission bandwidth 107 consists of a plurality of resource blocks (RBs) 109. One subframe 105 is 1 ms long and consists of two slots 103. Each of the RBs 109 includes 12 tones arranged in the frequency domain and 14 OFDM symbols arranged in the time domain, denoted as 113, or 12 tones arranged in the frequency domain and 12 OFDM symbols arranged in the time domain, denoted as 121.

Each RB becomes a basic unit for resource allocation. A resource allocation structure including 14 OFDM symbols is referred to as a normal CP subframe structure 113 and a resource allocation structure including 12 OFDM symbols is referred to as an extended CP subframe structure 121.

An RS 119 is a signal agreed upon between a UE and an eNB to enable the UE to estimate a channel RSs 123, 125, 127 and 129 are transmitted from antenna ports 0, 1, 2 and 3, respectively. If the number of antenna ports is more than 1, this means that a multi-antenna scheme is adopted.

In the frequency domain, the absolute positions of RSs in an RB are differently configured depending on a cell, whereas a relative interval between RSs is kept uniform. In other words, RSs of the same antenna port maintain an interval of 6 REs. The absolute positions of RSs are differently configured for each cell to avoid collision of RSs between cells. The number of RSs differs according to an antenna port. In more detail, for each of the antenna ports 0 and 1, a total of 8 RSs is present in one RB and one subframe, whereas, for each of the antenna ports 2 and 3, a total of 4 RBs is present in one RB and one subframe. Therefore, when four antennas are used, channel estimation accuracy using antenna ports 2 and 3 is lower than channel estimation accuracy using antenna ports 0 and 1.

There are two types of RSs: one is a common RS (CRS) and the other is a dedicated RS (DRS). The CRS is an RS that a cell transmits at a determined position so that all UEs can receive the CRS. The DRS is an RS that a cell transmits only on a specific resource allocated to one receiver. The DRS can be used for channel estimation only by the receiver to which the resource is scheduled and cannot be used by the other receivers.

Control channel signals are located at the beginning of one subframe in the time domain. Referring to FIG. 1, reference numeral 117 denotes a region in which the control channel signals can be located. The control channel signals may be transmitted over L OFDM symbols at the beginning of the subframe. L may be 1, 2, or 3. In the illustrated example of FIG. 1, L is 3.

If the amount of control channels is small enough to transmit the control channel signals only on one OFDM symbol, only the first OFDM symbol is used to transmit the control channel signals (L=1) and the remaining 13 OFDM symbols are used to transmit data channel signals. In this case, the value of L is used as basic information for demapping an allocated control channel resource in a control channel reception operation. Accordingly, if the UE fails to receive the value of L, the UE cannot recover the control channels.

If a subframe is configured as a multimedia broadcast over single frequency network (MBSFN) subframe, L is fixed to 2. An MBSFN is a channel for transmitting broadcast information. However, the MBSFN may be used for various purposes in the LTE-A system and also be used for relay backhaul transmission. If a subframe is indicated as the MBSFN subframe, an LTE UE can receive signals in a control channel region of the subframe but does not receive signals in a data region. However, an LTE-A UE may receive signals even in the data region of the subframe for other purposes.

The control channel signals are positioned at the beginning of the subframe to allow the UE to receive the control channel signals first to determine whether the data channel signals are transmitted thereto. According to the determination result, the UE may judge whether to perform a data channel reception operation. If no data channel signals are transmitted to the UE, the UE need not receive the data channel signals and thus can save power consumed for the data channel signal reception operation. In addition, the UE can reduce scheduling delay by receiving the control channel signals located at the beginning of the subframe faster than the data channel signals.

A downlink control channel defined in the LTE system is transmitted in units of resource element groups (REGs) 111. The downlink control channel includes a physical control format indicator channel (PCFICH), a physical hybrid automatic repeat request indicator channel (PHICH), a packet data control channel (PDCCH) 117 and a physical downlink shared channel (PDSCH).

The PCFICH is a physical channel for transmitting control channel format indicator (CCFI) information. A CCFI is 2-bit information for indicating the number, L, of symbols occupied by a control channel in a subframe. The UE may check the number of symbols allocated to the control channel based on a received CCFI. Therefore, the PCFICH is a channel that all UEs should receive first except for the case where a downlink resource is fixedly allocated. Since the UE is not aware of L before receiving the PCFICH, the PCFICH should always be transmitted on the first OFDM symbol of each subframe. The PCFICH is transmitted over an entire band by dividing 16 subcarriers by 4.

The PHICH is a physical channel for transmitting a downlink acknowledgement (ACK)/negative ACK (NACK) signal. The PHICH is received by a UE which is performing uplink data transmission. Accordingly, the number of PHICHs is proportional to the number of UEs performing uplink data transmission. The PHICH is transmitted on the first OFDM symbol ($L_{PHICH}=1$) or across three OFDM symbols ($L_{PHICH}=3$) of the control region. A base station (eNB) informs all UEs of PHICH configuration information (the amount of used channels, $L_{PHICH}$) through a primary broadcast channel (PBCH) during initial access of the UEs to a cell. The PHICH is transmitted at a predetermined position in each cell like the PCFICH. Accordingly, the UE may receive the PHICH configuration information by receiving the PBCH when the UE is connected to the cell regardless of other control channel information.

The PDCCH 117 is a physical channel for transmitting data channel allocation information or power control information. The PDCCH 117 may differently configure the coding rate thereof according to the channel state of the UE. The PDCCH 117 fixedly uses Quadrature Phase Shift Keying (QPSK) as a modulation scheme. To change the channel coding rate, the amount of resources used by one PDCCH 117 needs to be changed. For the UE having a good channel state, a high channel coding rate is used, thereby minimizing the amount of resources to be used. In contrast, for the UE having a poor channel state, a high channel coding rate is applied so as to receive signals even though a large amount of resources is used. The amount of resources consumed for each PDCCH is determined in units of control channel elements (CCEs). The CCE is composed of a plurality of REGs 111. To secure diversity, the REGs 111 of the PDCCH 117 are arranged in a control channel resource after interleaving is performed.

The PHICH multiplexes several ACK/NACK signals using a code division multiplexing (CDM) scheme. In a single REG, 8 PHICH signals are multiplexed into 4 real number parts and 4 imaginary number parts and repeated as many as NPHICH so as to be distributed as separately as possible in the frequency domain to obtain frequency diversity gain. By using NPHICH REGs, 8 or fewer PHICH signals may be configured. In order to configure 8 or more PHICH signals, another NPHICH REGs should be used.

After determining the resource amount and resources allocation for the PCFICH and the PHICH, the eNB determines the value of L. The eNB maps the remaining physical control channels except for the PCFICH and the PHICH to the REG of the allocated control channels based on the value of L. Next, the eNB performs interleaving to obtain frequency diversity gain. Interleaving is performed on total REGs of a subframe determined by the value of L in units of REGs of a control channel. The output of an interleaver of the control channel prevents ICI caused by using the same interleaver for cells and simultaneously obtains diversity gain by distantly distributing the REGs of the control channel allocated across one or multiple symbols in the frequency domain. In addition, it is guaranteed that REGs constituting the same control channel are equally distributed across symbols per control channel.

Figure 2:
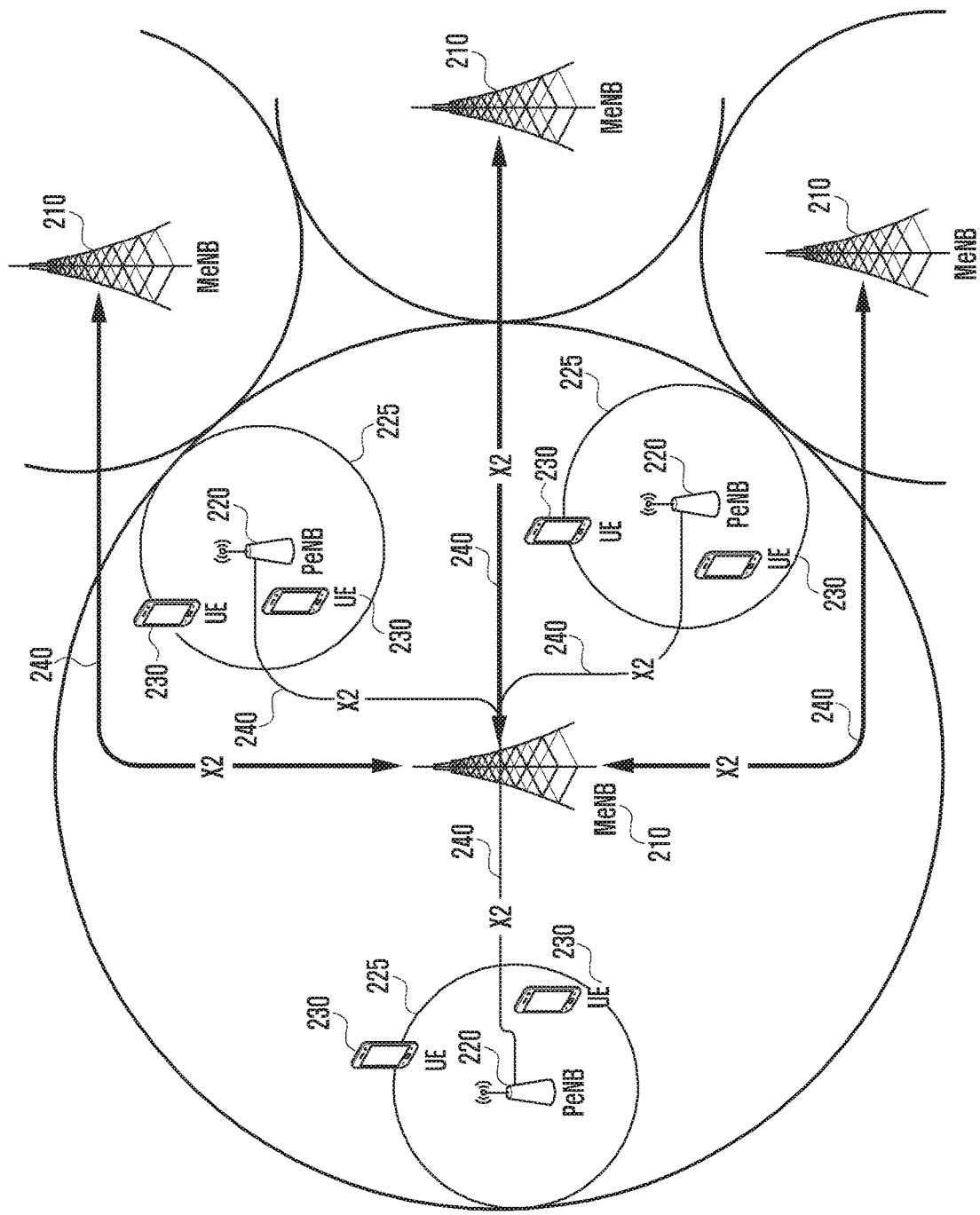
FIG. 2 illustrates a heterogeneous cell structure according to an embodiment of the present disclosure.

FIG. 2 illustrates a heterogeneous cell structure according to an embodiment of the present disclosure. In other words, FIG. 2 illustrates a heterogeneous system using a pico cell in an LTE-A system.

Referring to FIG. 2, a heterogeneous system is illustrated, in which different types or sizes of cells overlap each other. It is assumed in FIG. 2 that pico cells 220 are added to an environment in which macro cells 210 are present.

ICIC between the macro cells 210 is technology for reducing interference by exchanging information about resource utilization between cells. In LTE, technology for limiting the transmission power of a specific resource in the frequency domain may be used as the ICIC technology. The ICIC technology in LTE is used on the assumption that LTE eNBs are all macro cells. In the ICIC technology, a plurality of cells having an equal transmission power restricts the maximum transmission power of a specific resource.

As illustrated in FIG. 2, information of each eNB may be transmitted to a neighboring eNB which is physically connected thereto using an X2 backhaul 240. In the LTE-A system, a heterogeneous cell structure is adopted to increase transmission capability in a specific area by adding a cell (e.g. pico cell 220) having a relatively low transmission power to an existing LTE cell environment. A radius 225 of the pico cell 220 having a relatively low transmission power may be reduced by the transmission power of a macro cell 210 having a high transmission power. In other words, the radius 225 of the pico cell 220 having a transmission power lower than the macro cell 210 is remarkably reduced by the macro cell 210 having a high transmission power, so that the number of UEs 230 connected to the pico cell 220 may be reduced. In this case, performance of the heterogeneous cell structure may not be exerted. Although the same number of UEs should be connected to all eNBs in order to maximally use frequencies of the same band, fewer UEs are connected to an eNB having a lower cell radius in the case where the difference in radius between cells is big. As a result, system performance may be deteriorated.

To acquire maximum system performance, as many UEs 230 as possible should be connected to the pico cell 220 having a lower transmission power. To connect many UEs 230 to the pico cell 220 having a low transmission power, a method for expanding a cell radius should be considered. In this case, the UE 230 needs to recognize the pico cell 220 having a reception power lower than the macro cell 210 at a location at which transmission powers of the pico cell 220 and the macro cell 210 are equal as a target cell and to be connected to the pico cell 220.

In LTE, the UE 230 may indicate a prescribed value of the reception power strength of an eNB so as to be connected to an eNB having a weak reception power strength and this technology is referred to as cell range expansion. For example, the UE 230 may physically be located near to the macro cell 210 rather than the pico cell 220. In the case where the UE 230 actually transmits and receives a control channel and a data channel, the UE 230 may not perform a transmission and reception operation with the pico cell 220 due to strong interference from the macro cell 210. Then, an eNB may protect the transmission and reception of the control channel of the UE 230 which is near the macro cell 210 but is connected to the pico cell 220 by not arbitrarily transmitting some resources to the UE 230 and this is called an almost blank subframe (ABS) scheme.

Figure 3:
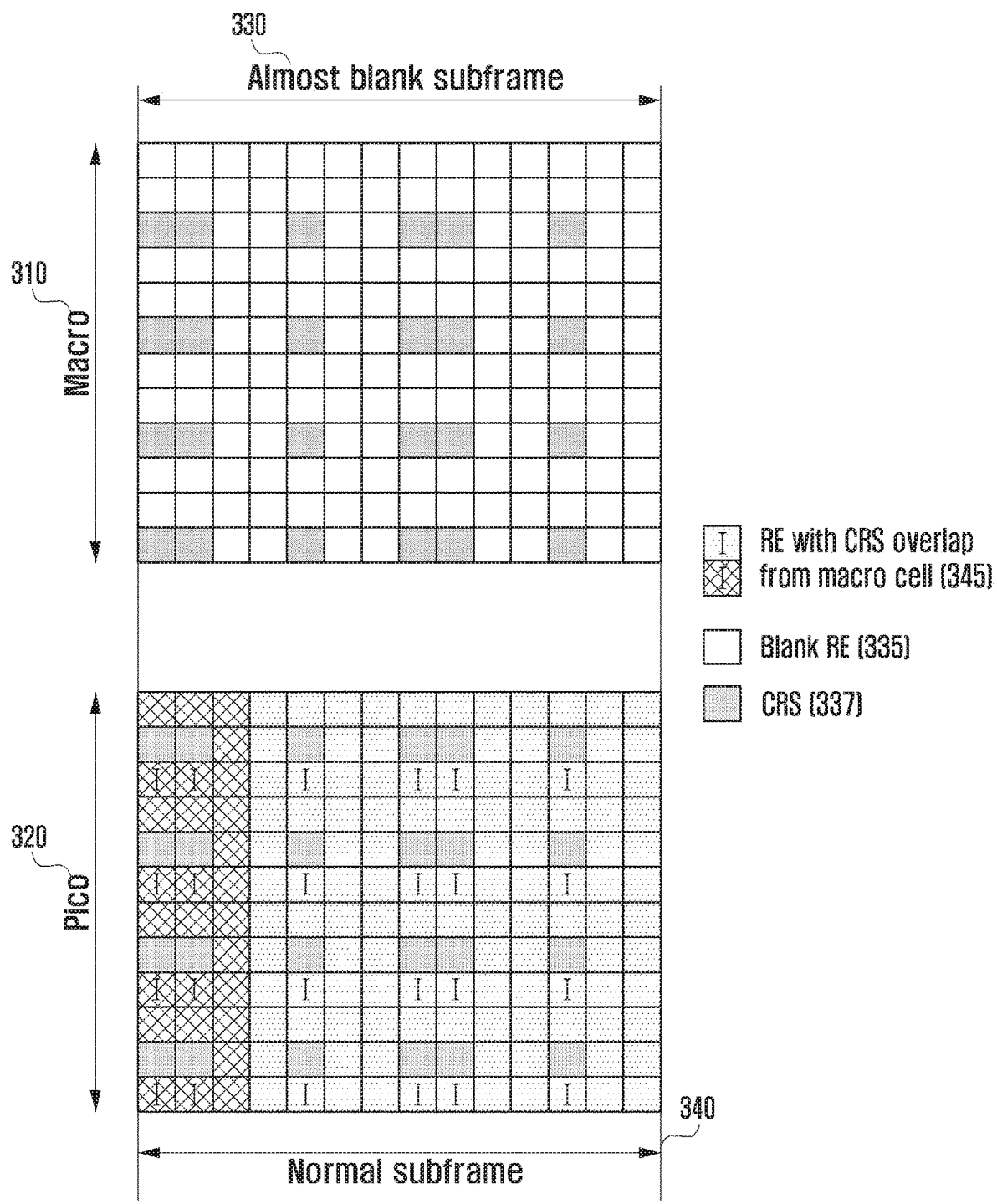
FIG. 3 illustrates an almost blank subframe (ABS) configuration according to an embodiment of the present disclosure.

FIG. 3 illustrates an ABS configuration according to an embodiment of the present disclosure.

Referring to FIG. 3, according to a configuration of an ABS 330, most signals in a macro cell 310 are not transmitted on blank REs 335. However, CRSs 337 and signals including system information can be transmitted. A UE connected to the macro cell 310 measures and feeds back a channel using the CRSs 337 on all frequency and time resources transmitted by a macro eNB. Therefore, unless the CRSs 337 are transmitted, the UE cannot be connected to the macro cell 310 anymore.

The CRSs 337 of the macro cell 310 may function as unique interference with respect to the UE connected to a pico cell 320, which are illustrated as REs having CRS overlap (from the macro cell 310) 345. The macro eNB that manages the macro cell configures some subframes among subframes in which the macro eNB transmits signals as ABSs and informs a pico eNB that manages the pico cell 320 of a normal subframe 340. In this case, it is necessary to determine which subframes the macro eNB should select as the ABSs.

Figure 4:
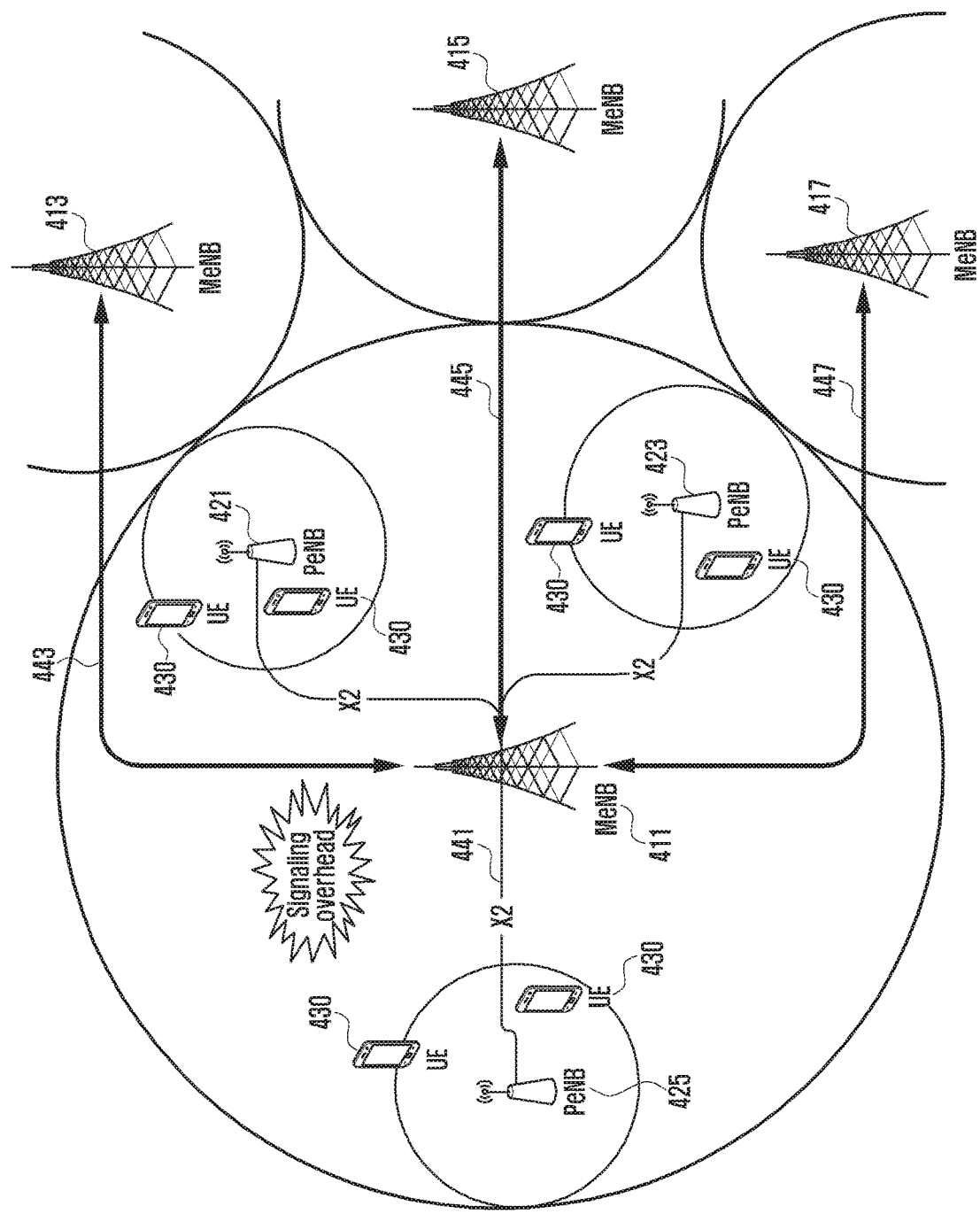
FIG. 4 illustrates an example of an ABS configuration and an information sharing method of the ABS configuration in a heterogeneous cell according to an embodiment of the present disclosure.

FIG. 4 illustrates an example of an ABS configuration and an information sharing method of the ABS configuration in a heterogeneous cell according to an embodiment of the present disclosure.

Referring to FIG. 4, MeNBs 411, 413, 415 and 417 are illustrated, where the MeNBs 411, 413, 415 and 417 may receive information regarding resource states from other MeNBs and schedule resources according to the resource states. For example, the MeNB 411 may receive resource related information of each MeNB from the MeNB 413, the MeNB 415 and the MeNB 417. The resource related information may be information about a resource state allocated from each MeNB. For example, in an environment in which the MeNB 411 is present, pico base stations (PeNBs) 421, 423 and 425 may be installed and the MeNB 411 may configure part of resources as an ABS so that the PeNBs 421, 423 and 425 may use the ABS for signal transmission and reception to an UE 430.

The MeNB 411 may transmit information about resources configured thereby as the ABS to other MeNBs 413, 415 and 417. Then, the MeNB 413, for example, may receive not only the information about the resource state received from the MeNB 411 but also information about resource states from the MeNB 415 and the MeNB 417. The MeNB 413 may determine resources which are to be configured as the ABS using information about resource states received from the MeNBs 411, 415 and 417. The MeNB 413 may transmit information about the ABS configured thereby to the MeNB 411, etc. and the MeNB 411 may use this information to configure the ABS.

In the above method in which each MeNB configures the ABS by exchanging information about the resource states of the MeNBs 411, 413, 415 and 417, the case where one MeNB should perform resource negotiation with multiple MeNBs may occur. In other words, one MeNB in an actual network may be encompassed by a plurality of MeNBs as illustrated in FIG. 4. Therefore, one MeNB should perform resource negotiation with N other MeNBs. In this way, if resource negotiation between the MeNBs 411, 413, 415 and 417 is conducted, overhead of X2 backhauls 441, 443, 445 and 447 for communication between the MeNBs 411, 413, 415 and 417 may increase.

Figure 5:
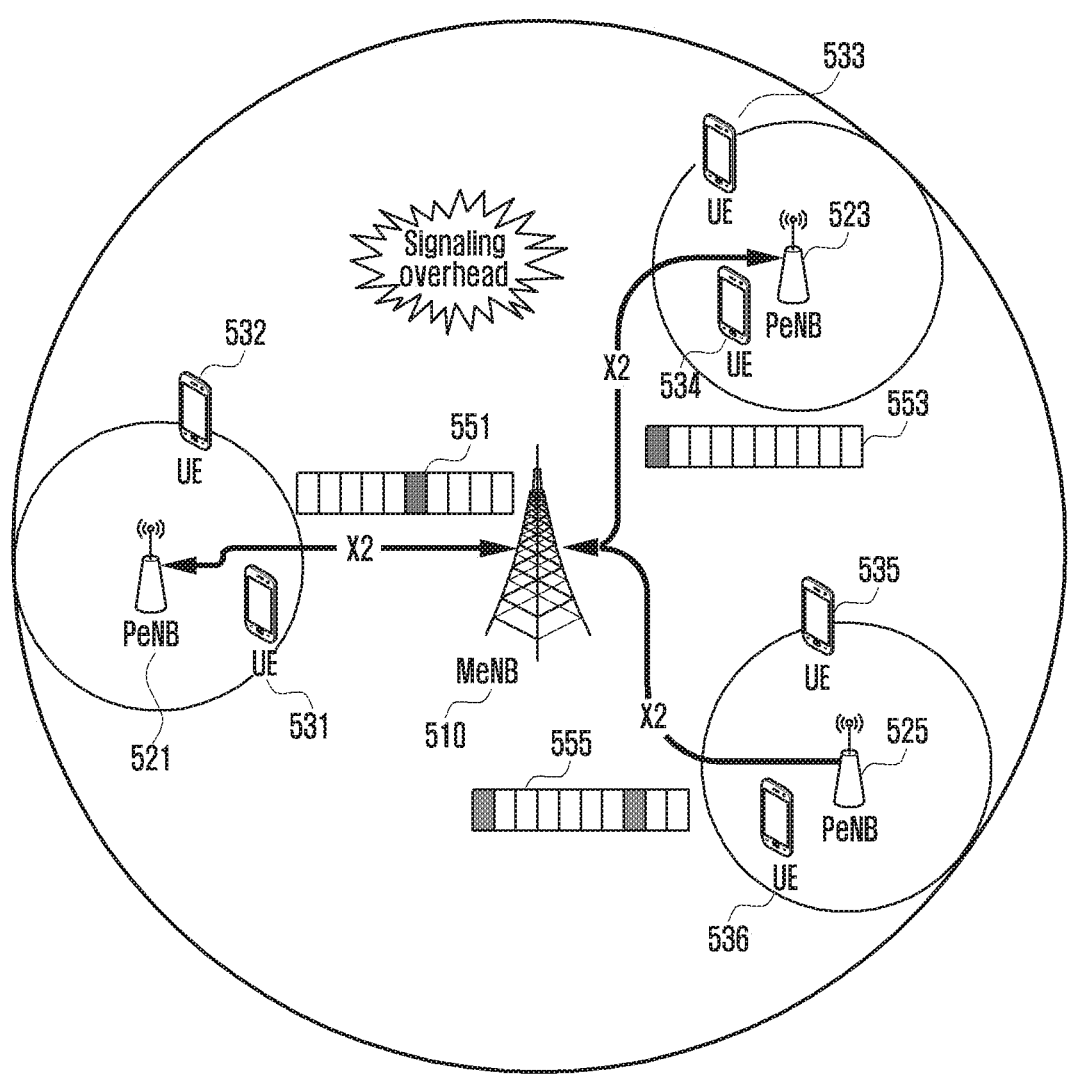
FIG. 5 illustrates an example of an ABS configuration and an information sharing method of the ABS configuration in a heterogeneous cell according to an embodiment of the present disclosure.

FIG. 5 illustrates an example of an ABS configuration and an information sharing method of the ABS configuration in a heterogeneous cell according to an embodiment of the present disclosure.

Referring to FIG. 5, an MeNB 510 is illustrated, where the MeNB 510 may transmit information about a configured ABS set to PeNBs 521, 523 and 525. The PeNBs 521, 523 and 525 may schedule the ABS set or a subset of the ABS set configured by the MeNB 510 for UEs 531, 532, 533, 534, 535 and 536 by using the received information about the ABS set. In addition, the PeNBs 521, 523 and 525 may feed back information about a scheduled channel for the UEs 531, 532, 533, 534, 535 and 536 to the MeNB 510. The MeNB 510 may determine subframes to which ABSs are to be applied using the information about the channel allocated to the UEs 531, 532, 533, 534, 535 and 536, received from the PeNBs 521, 523 and 525.

For example, the MeNB 510 may configure a set of subframes to which ABSs are to be applied, i.e. an ABS set. Next, the MeNB 510 may transmit information about the configured ABS set to the PeNBs 521, 523 and 525 connected thereto. Upon receiving the information about the ABS set from the MeNB 510, the PeNB 521 may schedule the ABS set or a subset 551 of the ABS set for the UEs 531 and 532. Similarly, the PeNB 523 may schedule the ABS set or a subset 553 of the ABS set for the UEs 533 and 534 and the PeNB 525 may schedule the ABS set or a subset 555 of the ABS set for the UEs 535 and 536. Meanwhile, the PeNB 521, the eNB 523 and the PeNB 525 may feed back information about scheduled channels for respective UEs to the MeNB 510. Upon receiving the information about the scheduled channels fed back from the PeNBs 521, 523 and 525, the MeNB 510 may determine subframes which are to be configured as ABSs using the feedback information.

In the case where the PeNBs 521, 523 and 525 feed back the information about scheduled channels for the UEs 531, 532, 533, 534, 535 and 536 to the MeNB 510 and the MeNB 510 configures the subframes which are to be configured as the ABSs, if the number of the PeNBs 521, 523 and 525 increases, performance of the MeNB 510 may be degraded.

In other words, the multiple PeNBs 521, 523 and 525 may select different ABS patterns, i.e. different subframes, as subframes scheduled for the UEs 531, 532, 533, 534, 535 and 536. If the selection of different patterns by the PeNBs 521, 523 and 525 is accepted, an ABS ratio used by the MeNB 510 increases and thus performance of the MeNB 510 may be deteriorated.

For example, the PeNB 521 may allocate the sixth subframe in the ABS subset 551 to the UEs 531 and 532, the PeNB 523 may allocate the first subframe in the ABS subset 553 to the UEs 533 and 534 and the PeNB 525 may allocate the first and eighth subframes in the ABS subset 555 to the UEs 535 and 536 as illustrated in FIG. 5. In this case, the MeNB 510 may receive the information about the allocated subframes from the PeNBs 521, 523 and 525 and configure the first, sixth and eighth subframes as ABSs. Although not shown, if another PeNB is present and the other PeNB allocates subframes different from subframes allocated by the PeNBs 521, 523 and 525 to the UEs 531, 532, 533, 534, 535 and 536, the number of subframes that the MeNB 510 is to configure as ABSs may increase.

In this method, additional signals for feeding back information about scheduled channels for the UEs 531, 532, 533, 534, 535 and 536 by the PeNBs 521, 523 and 525 need to be defined. In this case, the UEs 531, 532, 533, 534, 535 and 536 belonging to the PeNBs 521, 523 and 525 may transmit channel states thereof to the PeNBs 521, 523 and 525 in order to obtain ABS patterns suitable therefor and the PeNBs 521, 523 and 525 may use X2 backhauls between the MeNB 510 and the PeNBs 521, 523 and 525 in order to feed back the information scheduled for the UEs 531, 532, 533, 534, 535 and 536 to the MeNB 510. However, since backhaul resources between the PeNBs 521, 523 and 525 and the MeNB 510 in an actual network are insufficient, the throughput of the PeNBs 521, 523 and 525 may be reduced in proportion to backhaul overhead between the PeNBs 521, 523 and 525 and the MeNB 510. In addition, if the PeNBs 521, 523 and 525 are installed in an area including a large number of users, such as a hotspot, the backhaul overhead between the MeNB 510 and the PeNBs 521, 523 and 525 may increase when a situation in which the PeNBs 521, 523 and 525 are changed in real time is considered.

Figure 6:
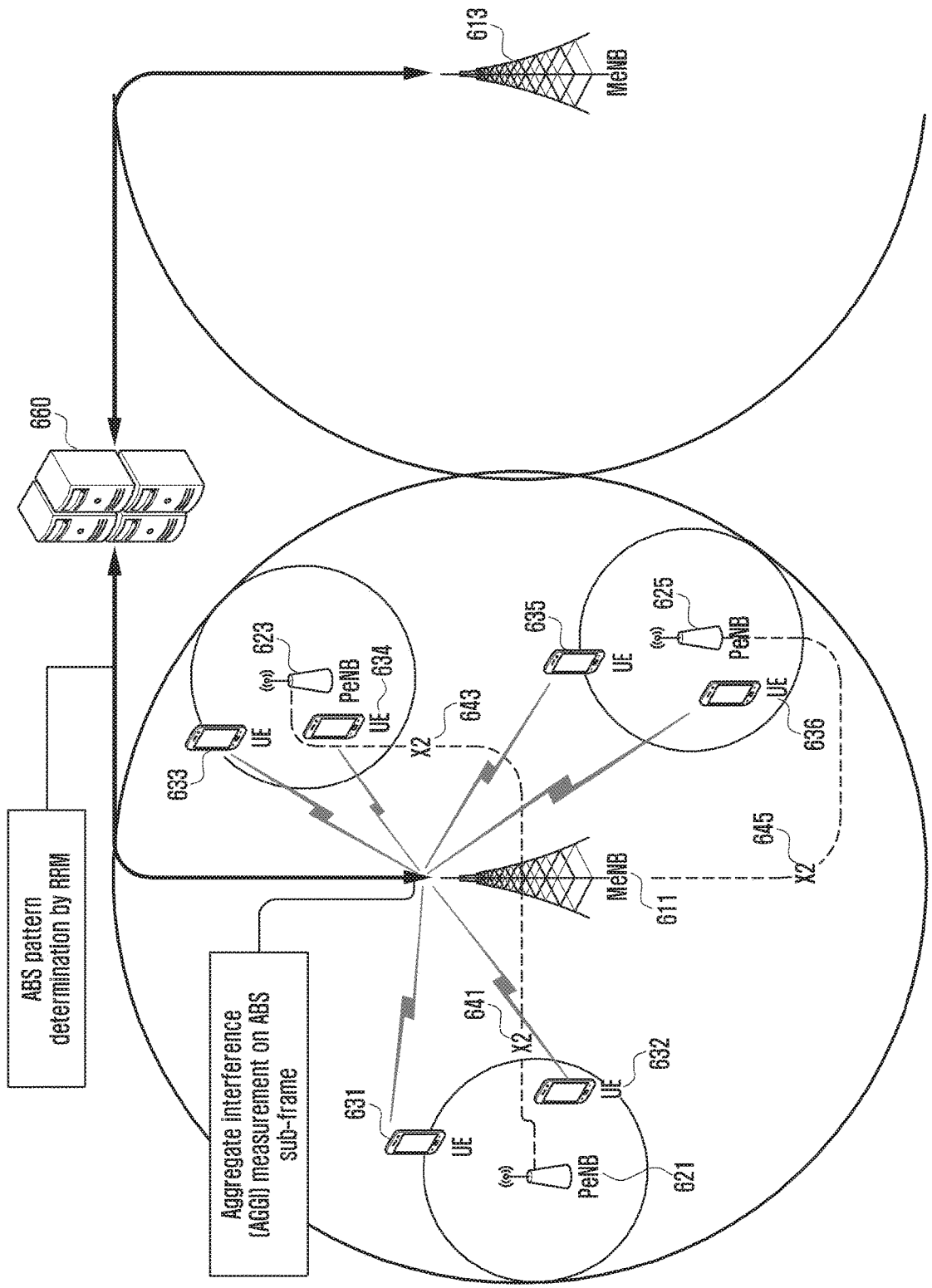
FIG. 6 illustrates an example of an ABS configuration and an information sharing method of the ABS configuration in a heterogeneous cell according to an embodiment of the present disclosure.

FIG. 6 illustrates an example of an ABS configuration and an information sharing method of the ABS configuration in a heterogeneous cell according to an embodiment of the present disclosure.

Referring to FIG. 6, a heterogeneous cell is illustrated, where the heterogeneous cell may include MeNBs 611 and 613 and PeNBs 621, 623 and 625 and may further include a Radio Resource Manager (RRM) 660 as a higher node. In an embodiment of the present disclosure, the term "RRM" is used for convenience of description based on functional properties and it is apparent that main principles of embodiments of the present disclosure are applicable to network entities of all types providing functions for resource allocation of each eNB.

According to the embodiment of the present disclosure, in order to determine whether UEs in the heterogeneous cell (i.e. pico cell) actually operate and to determine an ABS pattern considering the channel states of the UEs, the MeNBs 611 and 613 may measure RS powers of the UEs generated therein to obtain a total aggregate interference. The MeNBs 611 and 613 may transmit the measured result to the RRM 660. Upon receiving information about the total aggregate interference from the MeNBs 611 and 613, the RRM 660 may determine the ABS pattern based on the received information and inform the MeNBs 611 and 613 of the ABS pattern. According to this method, since X2 interfaces 641, 643 and 645 between the PeNBs 621, 623 and 625 and the MeNBs 611 and 613 are not needed, overhead therebetween can be reduced and thus performance of the PeNBs 621, 623 and 625 can be improved. In addition, since a higher node entity, for example the RRM 660, collects information of the multiple MeNBs 611 and 613 to determine ABS resources without using backhauls between the MeNBs 611 and 613, backhaul overhead between the MeNBs 611 and 613 can be reduced and thus communication performance can be improved.

For example, the MeNBs 611 and 613 may measure the RS powers of the UEs in the heterogeneous cell generated in a cell thereof as illustrated in FIG. 6. The MeNB 611, for example, includes the PeNB 621, the PeNB 623 and the PeNB 625 within the coverage thereof. There may be six UEs 631, 632, 633, 634, 635 and 636 to which the PeNBs 621, 623 and 625 provide services. The MeNB 611 may measure the RS powers of the UE 631 and the UE 632 serviced by the PeNB 621. The MeNB 611 may also measure the RS powers of the UE 633 and the UE 634 serviced by the PeNB 623 and the RS powers of the UE 635 and the UE 636 serviced by the PeNB 625. Then, the MeNB 611 may calculate a total aggregate interference (AGGI) using the RS powers of the UEs 631, 632, 633, 634, 635 and 636. Next, the MeNB 611 may transmit information about the AGGI to the RRM 660. Similar to the operation of the MeNB 611, the MeNB 613 may calculate the AGGI and transmit the AGGI to the RRM 660. While only two MeNBs are shown in FIG. 6, it is apparent that more than two MeNBs may be present.

Thereafter, the RRM 660 may determine ABS patterns to be applied to the MeNBs 611 and 613 using information about the AGGI received from at least one of the MeNBs 611 and 613. The RRM 660 may transmit the determined ABS patterns to the MeNBs 611 and 613. Then the MeNBs 611 and 613 may schedule resources according to the received ABS patterns.

Meanwhile, according to an embodiment of the present disclosure, the MeNBs 611 and 613 may determine an ABS ratio depending on Quality of Service (QoS) of a corresponding macro cell using the RS powers of UEs. In more detail, the MeNBs 611 and 613 may calculate a total AGGI according to the RS powers of the UEs and determine the ABS ratio using the AGGI according to Equation 1:

$$Pr[\Upsilon_0 < \gamma_0] < \delta \quad \text{Equation 1}$$

In Equation 1, $\Upsilon_0$ may denote a signal to interference plus noise ratio (SINR) value and $\Gamma_0$ may denote a specific reference SINR value (i.e. a threshold value).

The SINR value $\Upsilon_0$ may be calculated by Equation 2:

$$\gamma_0 = \frac{S_0}{I_{AGGI} + C_0} \quad \text{Equation 2}$$

In Equation 2, $I_{AGGI}$ denotes interference power, $C_0$ denotes noise power, and $S_0$ denotes signal power. The interference power $I_{AGGI}$ may be acquired by, for example, Equation 3:

$$I_{AGGI} = \sum_{j \in K} P_j \cdot e^{k\xi_{ij}} \cdot r_j^{-\alpha_s} \quad \text{Equation 3}$$

where $P_j$ may denote the RS power of each UE in a heterogeneous cell.

The noise power $C_0$ may be calculated by, for example, Equation 4:

$$C_0 = I_M + N \quad \text{Equation 4}$$

The signal power $S_0$ may be obtained by, for example, Equation 5:

$$S_0 = \sum_{i \in N} P_i \cdot e^{k\xi_{ii}} \cdot r_i^{-\alpha_m} \quad \text{Equation 5}$$

where $P_i$ may represent the RS power of each UE.

Referring back to Equation 1, the MeNBs 611 and 613 may determine the proportion of ABS s, i.e. an ABS ratio, according to a measured SINR value. If an AGGI is high, the MeNBs 611 and 613 may configure a higher ABS ratio in proportion to the AGGI (i.e. SINR value) of a UE in a heterogeneous cell. For example, the ABS ratio may be determined according to the probability that the SINR value $\Upsilon_0$ is less than $\Gamma_0$. That is, the probability that the SINR value $\Upsilon_0$ is less than $\Gamma_0$ may be compared with the value $\delta$ to determine the ABS ratio. In more detail, if the probability that the SINR value $\Upsilon_0$ is less than $\Gamma_0$ is less than 0.05, the ABS ratio may be set to 0%. If the probability that the SINR value $\Upsilon_0$ is less than $\Gamma_0$ is greater than 0.05 and less than 0.06, the ABS ratio may be set to, for example, 10%. Similarly, if the probability that the SINR value $\Upsilon_0$ is less than $\Gamma_0$ is greater than 0.06 and less than 0.07, the ABS ratio may be set to, for example, 20%. If the probability that the SINR value $\Upsilon_0$ is less than $\Gamma_0$ is greater than 0.09 and less than 0.10, the ABS ratio may be set to, for example, 50%. The ABS ratio according to the probability that the SINR value $\Upsilon_0$ is less than $\Gamma_0$ are merely exemplary and it is apparent that the ABS ratio may be differently configured according to a network environment.

The MeNBs 611 and 613 may transmit information about the configured ABS ratio to the RRM 660. The RRM 660 may determine an ABS pattern which is to be applied to the MeNBs 611 and 613 according to the received ABS ratio.

Meanwhile, according to an embodiment of the present disclosure, the ABS ratio which is to be applied to the MeNBs 611 and 613 may be determined not by the MeNBs 611 and 613 but using information about the interference amount received from the MeNBs 611 and 613 or the RS power of a UE.

Figure 7:
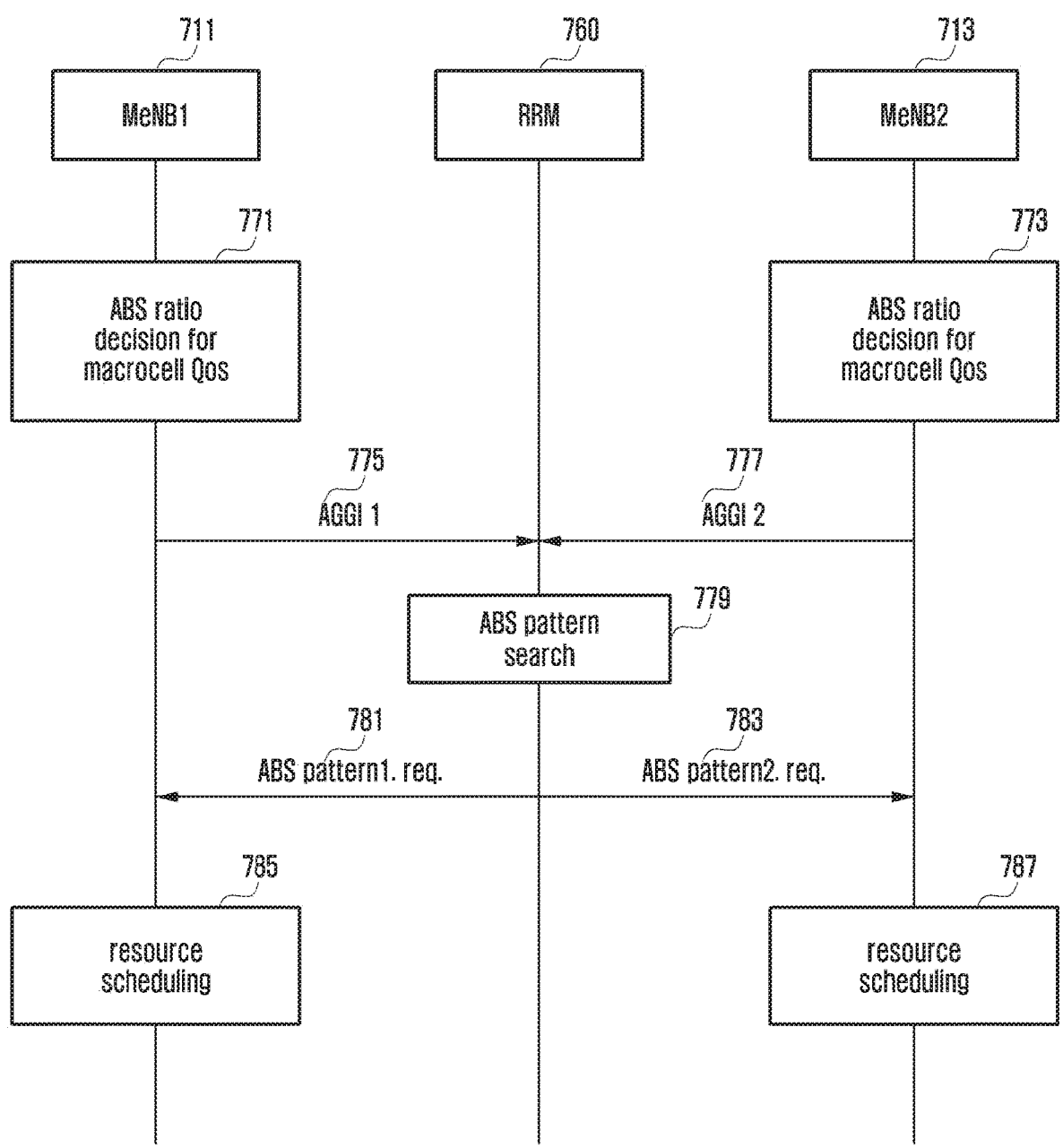
FIG. 7 is a flowchart illustrating an example of an ABS configuration and an information sharing method of the ABS configuration in a heterogeneous cell according to an embodiment of the present disclosure.

FIG. 7 is a flowchart illustrating an example of an ABS configuration and an information sharing method of the ABS configuration in a heterogeneous cell according to an embodiment of the present disclosure.

Referring to FIG. 7, an MeNB1 711, an RRM 760 and an MeNB2 713 are illustrated, where the MeNB1 711 may measure RS powers of UEs in at least one heterogeneous cell generated in a cell thereof, i.e. RS powers of UEs serviced by at least one PeNB. Then, the MeNB1 711 may determine a total AGGI using the measured RS powers of the UEs. According to an embodiment of the present disclosure, in operation 771 the MeNB1 711 may determine the ABS ratio of a corresponding macro cell QoS using information about the AGGI. The determination of the ABS ratio has been described above and, therefore, a detailed description thereof will be omitted.

Similar to the MeNB1 711, the MeNB2 713 may measure RS powers of UEs in the heterogeneous cell and determine a total AGGI. Although not shown, if other MeNBs are present, the MeNBs may measure the RS powers of UEs in the heterogeneous cell in macro cells thereof and determine a total AGGI. According to an embodiment of the present disclosure, in operation 773 the MeNB2 713 may determine the ABS ratio of a corresponding macro cell QoS using information about the AGGI.

In operations 775 and 777, the MeNB1 711 and the MeNB2 713 may transmit information about the AGGIs (e.g., AGGI 1 and AGGI 2) of macro cells thereof determined in operations 771 and 773 to the RRM 760. When other MeNBs are present, the other MeNBs may transmit information about determined AGGIs to the RRM 760 in a similar manner. According to an embodiment of the present disclosure, when the MeNBs 711 and 713 determine the ABS ratios thereof in operations 711 and 773, the MeNBs 711 and 713 may transmit information about the determined ABS ratios to the RRM 760.

In operation 779, the RRM 760 may determine ABS patterns using the information about AGGIs of the MeNBs 711 and 713 received in operations 775 and 777. According to an embodiment of the present disclosure, the RRM 760 may determine ABS ratios which are to be applied to the MeNBs 711 and 713 using the AGGIs received from the MeNBs 711 and 713. The RRM 760 may determine the ABS patterns which are to be applied to the MeNBs 711 and 713 according to the determined ABS ratios.

Alternatively, according to an embodiment of the present disclosure, upon receiving the ABS ratios from the MeNBs 711 and 713 in operations 775 and 777, the RRM 760 may determine ABS patterns applied to the MeNBs 711 and 713 according to the received ABS ratios.

In operations 781 and 783, the RRM 760 may transmit information (e.g., ABS pattern 1 requirements and ABS pattern 2 requirements) about the determined ABS patterns to the MeNBs 711 and 713. Upon receiving the information about the ABS patterns, the MeNBs 711 and 713 may perform resource scheduling in operations 785 and 787.

Therefore, since X2 interfaces between PeNBs and the MeNBs 711 and 713 are not needed, overhead therebetween can be reduced and thus performance of the PeNBs can be improved. In addition, since a higher node entity, i.e. the RRM 760, collects information of the multiple MeNBs 711 and 713 to determine ABS resources without using backhauls between the MeNBs 711 and 713, backhaul overhead between the MeNBs 711 and 713 can be reduced and thus communication performance can be improved.

Figure 8:
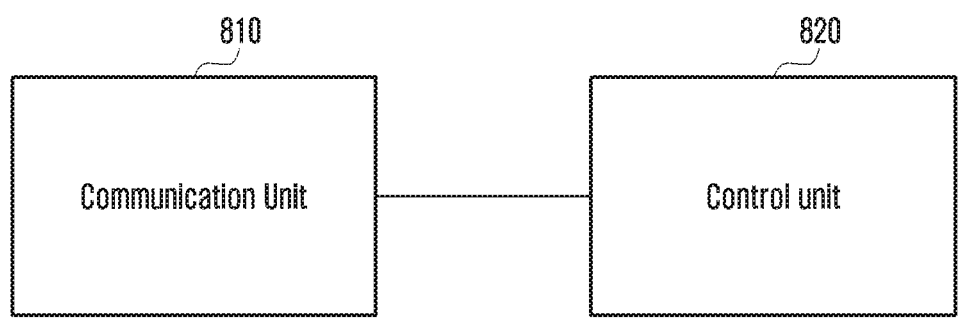
FIG. 8 is a block diagram of an evolved Node B (eNB) according to an embodiment of the present disclosure.

FIG. 8 is a block diagram of an eNB according to an embodiment of the present disclosure.

Referring to FIG. 8, a communication unit 810 and a control unit 820 of an eNB are illustrated, where the communication unit 810 and the control unit 820 may be configured to control the overall operation of the eNB.

The control unit 820 of the eNB controls the eNB to perform any one operation of the above-described embodiments. For example, the control unit 810 of an MeNB may control determining an AGGI from a UE in a heterogeneous cell, transmitting information about the AGGI to a higher node entity, receiving information about an ABS pattern from the higher node entity, and configuring an ABS subframe using the information about the ABS pattern.

The communication unit 810 of the eNB transmits and receives signals according to any one of the above-described embodiments. For example, the communication unit 810 may communicate with other network entities. In more detail, the communication unit 810 of the MeNB may transmit the information about the AGGI received from the UE in the heterogeneous cell to an RRM. The communication unit 810 may receive the information about the ABS pattern from the RRM.

Figure 9:
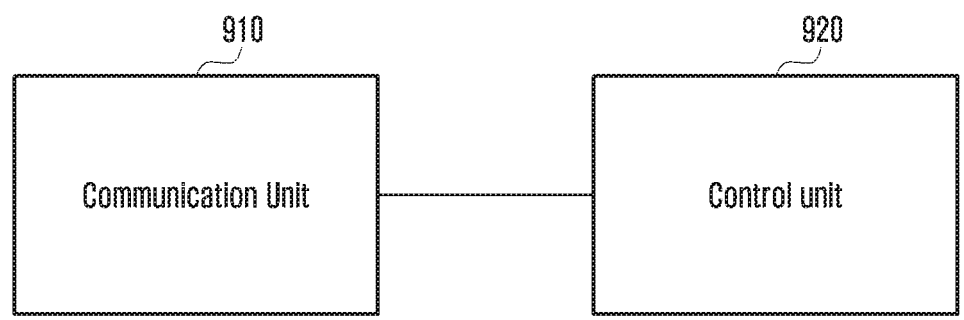
FIG. 9 is a block diagram of a radio resource manager (RRM) according to an embodiment of the present disclosure.

FIG. 9 is a block diagram of an RRM according to an embodiment of the present disclosure.

Referring to FIG. 9, a communication unit 910 and a control unit 920 of an RRM are illustrated, where the communication unit 910 and the control unit 920 may be configured to control the overall operation of the RRM.

The control unit 920 of the RRM controls the RRM to perform any one operation of the above-described embodiments. For example, the control unit 920 of the RRM may control receiving information about an AGGI caused by a UE in a heterogeneous cell from at least one eNB, determining an ABS pattern which is to be applied to the at least one eNB using the information about the AGGI, and transmitting information about the ABS pattern to the at least one eNB.

In addition, the communication unit 910 of the RRM transmits and receives signals according to any one operation of the above-described embodiments. For example, the communication unit 910 may communicate with other network entities. In more detail, the communication unit 910 may receive the information about the AGGI caused by the UE in the heterogeneous cell from an MeNB. In addition, the communication unit 910 may transmit the information about the determined ABS pattern to the MeNB.

Figure 10:
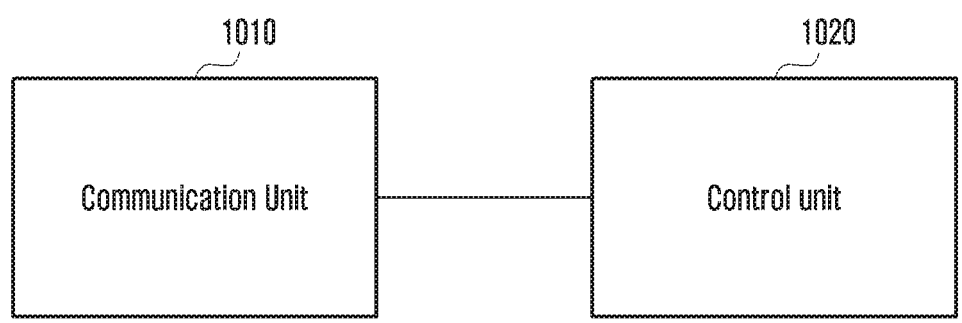
FIG. 10 is a block diagram of a user equipment (UE) according to an embodiment of the present disclosure.

FIG. 10 is a block diagram of a UE according to an embodiment of the present disclosure.

Referring to FIG. 10, a communication unit 1010 and a control unit 1020 of a UE are illustrated, where the communication unit 1010 and the control unit 1020 may be configured to control the overall operation of the UE.

The control unit 1020 of the UE controls the UE to perform any one operation of the above-described embodiments. For example, the control unit 1020 of the UE may control signal exchange with an eNB using an allocated resource based on resource scheduling information received from the eNB.

The communication unit 1010 of the UE transmits and receives signals according to any one operation of the above-described embodiments. For example, the communication unit 1010 may communicate with other network entities. In more detail, the communication unit 1010 may receive resource scheduling information including information about an ABS configured by the MeNB from the MeNB.

According to an embodiment of the present disclosure, since an X2 interface is not needed between a PeNB and a MeNB, overhead therebetween can be reduced and thus performance of the PeNB can be improved.

In addition, since a network entity of a higher node determines an ABS resource by collecting information about a plurality of MeNBs without using a backhaul between the MeNBs, backhaul overhead between the MeNBs can be reduced and thus communication performance can be improved.

It will be appreciated by persons skilled in the art that the effects that can be achieved through the present disclosure are not limited to what has been particularly described hereinabove and other advantages of the present disclosure will be more clearly understood from the above detailed description.

In the above-described embodiments, all operations and messages may be selectively performed or part of the operations and messages may be omitted. In each embodiment, the operations are not necessarily performed in accordance with the described order and may be rearranged. The messages need not always be transmitted in order and transmission orders of the messages may be changed. The operations and message transmission operations may be independently performed.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks and optical data storage devices. The non-transitory computer readable recording medium can also be distributed over network coupled computer systems so that the computer readable code is stored and executed in a distributed fashion. Also, functional programs, code and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks and optical data storage devices. The processor readable mediums can also be distributed over network coupled computer systems so that the instructions are stored and executed in a distributed fashion. Also, functional computer programs, instructions and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of a first base station, the communication method comprising:
    measuring, by the first base station, a reference signal (RS) transmitted from a second base station to at least one terminal;
    determining, by the first base station, an interference for the at least one terminal connected to the second base station, based on the RS;
    transmitting, by the first base station, information on the interference to a higher node entity, the higher node entity comprising an entity higher than a base station;
    in response to transmitting the information on the interference, receiving, from the higher node entity, information on an almost blank subframe (ABS) pattern, which is determined by the higher node entity based on the information on the interference; and
    performing, by the first base station, a scheduling based on the information on the ABS pattern.

2. The communication method of claim 1, wherein the determining of the interference further comprises determining an ABS ratio based on the information on the interference.

3. The communication method of claim 2, wherein the ABS ratio is proportional to the interference.

4. The communication method of claim 1, wherein the higher node entity comprises a radio resource manager (RRM).

5. The communication method of claim 1, wherein the first base station comprises a macro base station and the second base station comprises a small cell base station.

6. A communication method of a higher node entity, the communication method comprising:
    receiving, from at least one first base station, information on an interference for at least one terminal connected to a second base station, the information on the interference being determined by the at least one first base station based on a reference signal (RS) transmitted from the second base station to the at least one terminal;
    in response to receiving the information on the interference from the at least one first base station, determining an almost blank subframe (ABS) pattern based on the information on the interference; and
    transmitting information on the ABS pattern to the at least one first base station,
    wherein the RS is measured by the at least one first base station,
    wherein a scheduling for the at least one terminal based on the information on the ABS pattern is performed by the at least one first base station, and
    wherein the higher node entity comprises an entity higher than a base station.

7. The communication method of claim 6, wherein the receiving of the information on the interference comprises receiving an ABS ratio determined based on the information on the interference.

8. The communication method of claim 6, wherein the determining of the ABS pattern comprises:
    determining an ABS ratio applied to the at least one first base station based on the information on the interference; and
    determining the ABS pattern applied to the at least one first base station based on the determined ABS ratio.

9. The communication method of claim 8, wherein the ABS ratio is proportional to the interference.

10. The communication method of claim 6, wherein the at least one first base station comprises a macro base station and the second base station comprises at least one of a small cell base station or a pico cell base station.

11. A first base station, the first base station comprising:
    a transceiver configured to transmit and receive a signal to and from other network entities; and
    a processor configured to:
        measure a reference signal (RS) transmitted from a second base station to at least one terminal,
        determine an interference for the at least one terminal connected to the second base station based on the RS,
        transmit information on the interference to a higher node entity, the higher node entity comprising an entity higher than a base station, in response to transmitting the information on the interference, receive, from the higher node entity, information on an almost blank subframe (ABS) pattern, which is determined by the higher node entity based on the information on the interference, and perform a scheduling based on the information on the ABS pattern.

12. The first base station of claim 11, wherein the processor is further configured to determine an ABS ratio based on the information on the interference.

13. The first base station of claim 12, wherein the ABS ratio is proportional to the interference.

14. The first base station of claim 11, wherein the higher node entity comprises a radio resource manager (RRM).

15. The first base station of claim 11, wherein the first base station comprises a macro base station and the second base station comprises a small cell base station.

16. A higher node entity, the higher node entity comprising:

a transceiver configured to transmit and receive a signal to and from other network entities; and a processor configured to:

receive, from at least one first base station, information on an interference for at least one terminal connected to a second base station, the information on the interference being determined by the at least one first base station based on a reference signal (RS) transmitted from the second base station to the at least one terminal, in response to receiving the information on the interference from the at least one first base station, determine an almost blank subframe (ABS) pattern based on the information on the interference, and transmit information on the ABS pattern to the at least one first base station, wherein the RS is measured by the at least one first base station, wherein a scheduling for the at least one terminal based on the information on the ABS pattern is performed by the at least one first base station, and wherein the higher node entity comprises an entity higher than a base station.

17. The higher node entity of claim 16, wherein the processor is further configured to receive an ABS ratio determined based on the information on the interference.

18. The higher node entity of claim 16, wherein the processor is further configured to:

determine an ABS ratio applied to the at least one first base station based on the information on the interference, and determine an ABS pattern applied to the at least one first base station based on the determined ABS ratio.

19. The higher node entity of claim 18, wherein the ABS ratio is proportional to the interference.

20. The higher node entity of claim 16, wherein the at least one first base station comprises a macro base station and the second base station comprises at least one of a small cell base station or a pico cell base station.

21. The method of claim 1, wherein the determining of the interference for the at least one terminal comprises calculating a total aggregate interference as the interference based on RS powers of the at least one terminal within coverage of the first base station and connected to the second base station.

* * * * *